(12) United States Patent
Zhang et al.

(10) Patent No.: US 12,511,400 B2
(45) Date of Patent: Dec. 30, 2025

(54) EMBEDDED ELECTRONIC DEVICE AND BOOT METHOD THEREOF

(71) Applicant: REALTEK SEMICONDUCTOR CORP., Hsinchu (TW)

(72) Inventors: Tian-Yuan Zhang, Suzhou (CN); Yang Lu, Suzhou (CN); Gang Shen, Suzhou (CN); Dong-Yu He, Suzhou (CN)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 265 days.

(21) Appl. No.: 18/204,618

(22) Filed: Jun. 1, 2023

(65) Prior Publication Data

US 2023/0394156 A1    Dec. 7, 2023

(30) Foreign Application Priority Data

Jun. 6, 2022    (CN) .......................... 202210632401.3

(51) Int. Cl.
  *G06F 21/00*  (2013.01)
  *G06F 13/16*  (2006.01)
  *G06F 21/57*  (2013.01)

(52) U.S. Cl.
  CPC ........ *G06F 21/575* (2013.01); *G06F 13/1668* (2013.01)

(58) Field of Classification Search
  CPC .......................... G06F 21/575; G06F 13/1668
  See application file for complete search history.

(56) References Cited

U.S. PATENT DOCUMENTS

| | | | |
|---|---|---|---|
| 2017/0277897 A1* | 9/2017 | Jang | G06F 21/575 |
| 2018/0275731 A1* | 9/2018 | Engler | G06F 1/24 |
| 2019/0079877 A1* | 3/2019 | Gaur | G06F 12/0811 |
| 2022/0114094 A1* | 4/2022 | Helmick | G06F 12/0623 |

OTHER PUBLICATIONS

Lohr et al., "Patterns for Secure Boot and Secure Storage in Computer Systems", 2010 International Conference on Availability, Reliability and Security, Date of Conference: Feb. 15-18, 2010.*
Gotzfried et al., "Mutual Authentication and Trust Bootstrapping towards Secure Disk Encryption", ACM Transactions on Information and System Security (TISSEC), vol. 17, Issue 2, Nov. 2014.*

* cited by examiner

*Primary Examiner* — Morshed Mehedi
(74) *Attorney, Agent, or Firm* — Birch, Stewart, Kolasch & Birch, LLP (57) ABSTRACT

An embedded electronic device and a boot method are provided. A processor of the embedded electronic device is configured to execute following steps based on a first boot procedure: verifying whether a second memory device safely corresponds to a first memory controller; in response to that the second memory device safely corresponds to the first memory controller, deciphering and verifying stored data of the second memory device through the first memory controller; and in response to that the second memory device does not safely correspond to the first memory controller, verifying whether the second memory device safely corresponds to a second memory controller.

18 Claims, 9 Drawing Sheets

EMBEDDED ELECTRONIC DEVICE AND BOOT METHOD THEREOF

CROSS-REFERENCE TO RELATED APPLICATION

This non-provisional application claims priority under 35 U.S.C. § 119(a) to Patent Application No. 202210632401.3 filed in China, P.R.C. on Jun. 6, 2022, the entire contents of which are hereby incorporated by reference.

BACKGROUND

Technical Field

The instant disclosure relates to embedded electronic device technology, especially an embedded electronic device and a boot method related to boot procedure verification loading.

Related Art

A boot-loader, also known as the firmware of an embedded electronic device, is a program of the embedded electronic device before the operating system kernel runs. The boot-loader executes a boot procedure of the embedded electronic device. Through activating the boot-loader, the embedded electronic device can initialize a hardware device and establish memory space mapping so as to set a hardware environment of the embedded electronic device as a suitable state, hence an appropriate software environment is ready for the operating system kernel. Because the embedded electronic device is often customized to meet various requirements, the boot-loader is often divided into a plurality of stages. A boot-loader portion of the embedded electronic device is usually stored in an external flash memory. In safe boot mode, the embedded electronic device needs to verify the safety of the external memory and the code correctness and validity by executing a first stage boot loader, and after the verification is passed, the embedded electronic device can execute the whole boot-loader. For existing technologies known to the inventor, various types of external flash memories (NAND flash, NOR flash, eMMC, etc.) need to configure different work modes through a general-purpose input/output (GPIO) interface and then adopt an access method corresponding to the external flash memory to obtain the contents stored in the external memory. However, this process occupies more interface pins of the GPIO.

SUMMARY

In view of this, some exemplary embodiments of the instant disclosure provide an embedded electronic device and a boot procedure to improve existing technologies known to the inventor.

An exemplary embodiment of the instant disclosure provides an embedded electronic device. The embedded electronic device comprises a processor, a first memory device, a plurality of memory controllers, and a second memory device. The first memory device is configured to store a first boot procedure. The memory controllers comprise a first memory controller and a second memory controller. The second memory device is connected to the memory controllers. The processor is configured to execute following steps based on the first boot procedure: verifying whether the second memory device safely corresponds to the first memory controller; in response to that the second memory device safely corresponds to the first memory controller, deciphering and verifying stored data of the second memory device through the first memory controller; and in response to that the second memory device does not safely correspond to the first memory controller, verifying whether the second memory device safely corresponds to the second memory controller.

An exemplary embodiment of the instant disclosure provides an embedded electronic device. The embedded electronic device comprises a processor, a first memory device, a plurality of memory controllers, a register, and a second memory device. The first memory device is configured to store a first boot procedure. The memory controllers comprise a first memory controller and a second memory controller. The second memory device is connected to the memory controllers. The first memory controller is configured to run a test on the second memory device and write a data into a register based on a result of the test after the embedded electronic device is booted up. The processor is configured to execute following steps based on the first boot procedure: in response to that the data is a first value, verifying whether the second memory device safely corresponds to the first memory controller; in response to that the second memory device safely corresponds to the first memory controller, deciphering and verifying stored data of the second memory device through the first memory controller; and in response to that the data is a second value or that the second memory device does not safely correspond to the first memory controller, verifying whether the second memory device safely corresponds to the second memory controller.

An exemplary embodiment of the instant disclosure provides a boot method adapted for the aforementioned embedded electronic devices. The boot method comprises executing following steps by a processor based on a first boot procedure: verifying whether a second memory device safely corresponds to a first memory controller; in response to that the second memory device safely corresponds to the first memory controller, deciphering and verifying stored data of the second memory device through the first memory controller; and in response to that the second memory device does not safely correspond to the first memory controller, verifying whether the second memory device safely corresponds to a second memory controller.

An exemplary embodiment of the instant disclosure provides a boot method adapted for the aforementioned embedded electronic devices. The boot method comprises: after the embedded electronic device is booted up, running a test on a second memory device and writing a data into a register based on a result of the test by a first memory controller; and executing following steps by a processor based on a first boot procedure: in response to that the data is a first value, verifying whether the second memory device safely corresponds to the first memory controller; in response to that the second memory device safely corresponds to the first memory controller, deciphering and verifying stored data of the second memory device through the first memory controller; and in response to that the data is a second value or that the second memory device does not safely correspond to the first memory controller, verifying whether the second memory device safely corresponds to a second memory controller.

As above, some exemplary embodiments of the instant disclosure provide an embedded electronic device and a boot method, wherein through memory-mapped I/O (MMIO) architecture, the data of the bus address being mapped by the external memory device can be read. As a result, the correctness and safety of the external memory device can be verified without occupying more GPIO pins, and thus a safe second boot procedure can be read.

BRIEF DESCRIPTION OF THE DRAWINGS

The disclosure will become more fully understood from the detailed description given herein below for illustration only, and thus not limitative of the disclosure, wherein:

FIG. 3-1 illustrates a schematic flowchart of a boot method according to an exemplary embodiment of the instant disclosure;

FIG. 3-2 illustrates a schematic flowchart of a boot method according to an exemplary embodiment of the instant disclosure;

FIG. 6-1 illustrates a schematic flowchart of a boot method according to an exemplary embodiment of the instant disclosure;

FIG. 6-2 illustrates a schematic flowchart of a boot method according to an exemplary embodiment of the instant disclosure;

DETAILED DESCRIPTION

The foregoing illustration and other technical contents, features, and functions of the instant disclosure will be clearly presented through the following detailed description with the provided figures. The widths and sizes of the elements in the figures may be exaggerated or abbreviated and are meant to help persons skilled in the art understand and read the instant disclosure, and the sizes of the elements in the figures may not be their actual sizes but do not limit the embodied limitations of the instant disclosure and thus do not possess technically practical context. Any structural modification or changes in ratios or sizes shall fall into the scope of the technical context of the instant disclosure as long as they do not affect the functions and goals of the instant disclosure. The same symbols among all figures are used to denote identical or similar elements.

Figure 1:
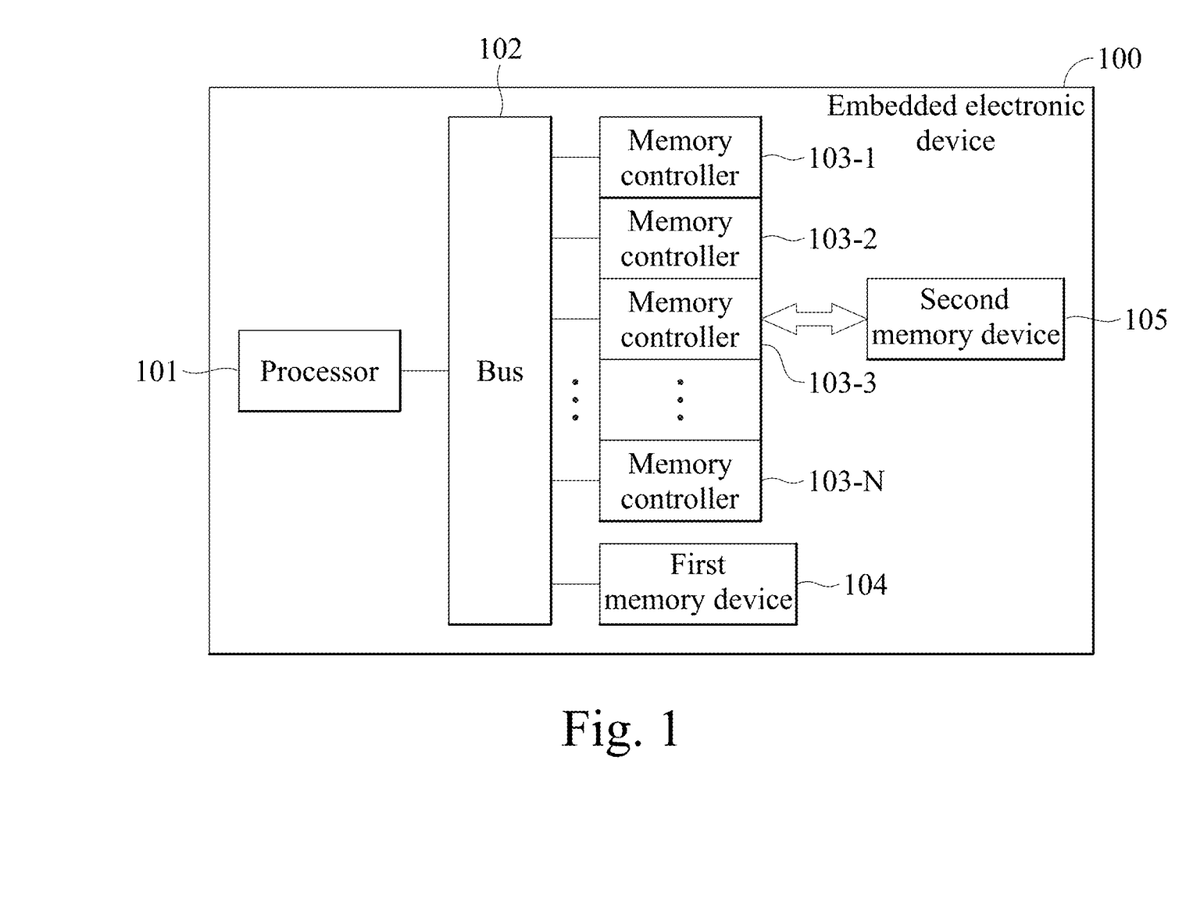
FIG. 1 illustrates a schematic block diagram of an embedded electronic device according to an exemplary embodiment of the instant disclosure.

FIG. 1 illustrates a schematic block diagram of an embedded electronic device 100 according to an exemplary embodiment of the instant disclosure. Please refer to FIG. 1. The embedded electronic device 100 comprises a processor 101, a bus 102, a plurality of memory controllers 103-1 through 103-N, a first memory device 104, and a second memory device 105, where N is a positive integer. The first memory device 104 is configured to store a first boot procedure of the embedded electronic device 100. The memory controllers 103-1 through 103-N are connected to the second memory device 105. The bus 102 is configured to connect the processor 101 to the memory controllers 103-1 through 103-N and the first memory device 104. The processor 101 can individually turn on or turn off the memory controllers 103-1 through 103-N.

In some exemplary embodiments of the instant disclosure, the first memory device 104 is a read-only memory (ROM). The first boot procedure is a first stage system activation loader. After the embedded electronic device 100 is powered on, the processor 101 reads and executes the first boot procedure stored in the first memory device 104 so as to initialize the embedded electronic device 100. The second memory device 105 is a flash memory configured to store a second boot procedure enciphered by the embedded electronic device 100. The second memory device 105 may be, but not limited to, an NOR flash, an NAND flash, or an embedded multimedia card.

The following will illustrate in detail the boot method and the cooperation between the hardware components of the embedded electronic device 100 according to an exemplary embodiment of the instant disclosure with the aid of provided figures.

Figure 31:
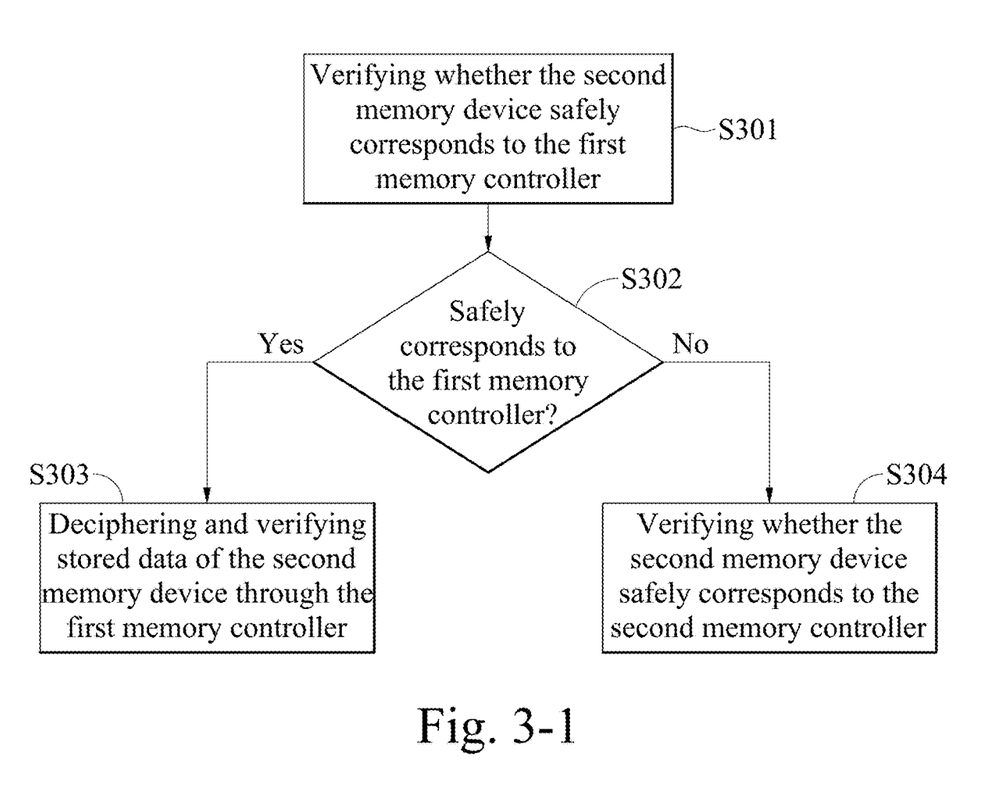

FIG. 3-1 illustrates a schematic flowchart of a boot method according to an exemplary embodiment of the instant disclosure. For illustrative purposes, the memory controller 103-1 is referred to as a first memory controller, the memory controller 103-2 is referred to as a second memory controller, the memory controller 103-3 is referred to as a third memory controller, and so on hereinafter. Please refer to FIG. 1 and FIG. 3-1. In this exemplary embodiment, in the step S301, the processor 101 verifies whether the second memory device 105 safely corresponds to the first memory controller (i.e., the memory controller 103-1), that is, in this embodiment, the processor 101 verifies whether the first memory controller can control the second memory device 105, and the processor 101 also verifies whether the second memory device 105 meets the requirement for safe booting. In the step S302, the processor 101 determines whether the second memory device 105 safely corresponds to the first memory controller, and, if the determination comes out positive, the step S303 is executed, or else the step S304 is executed.

In the step S303, because the processor 101 has determined that the second memory device 105 safely corresponds to the first memory controller, the processor 101 deciphers and verifies stored data of the second memory device 105 through the first memory controller. In the step S304, because the processor 101 has determined that the second memory device 105 does not safely correspond to the first memory controller, the processor 101 further verifies whether the second memory device 105 safely corresponds to the second memory controller.

Figure 32:
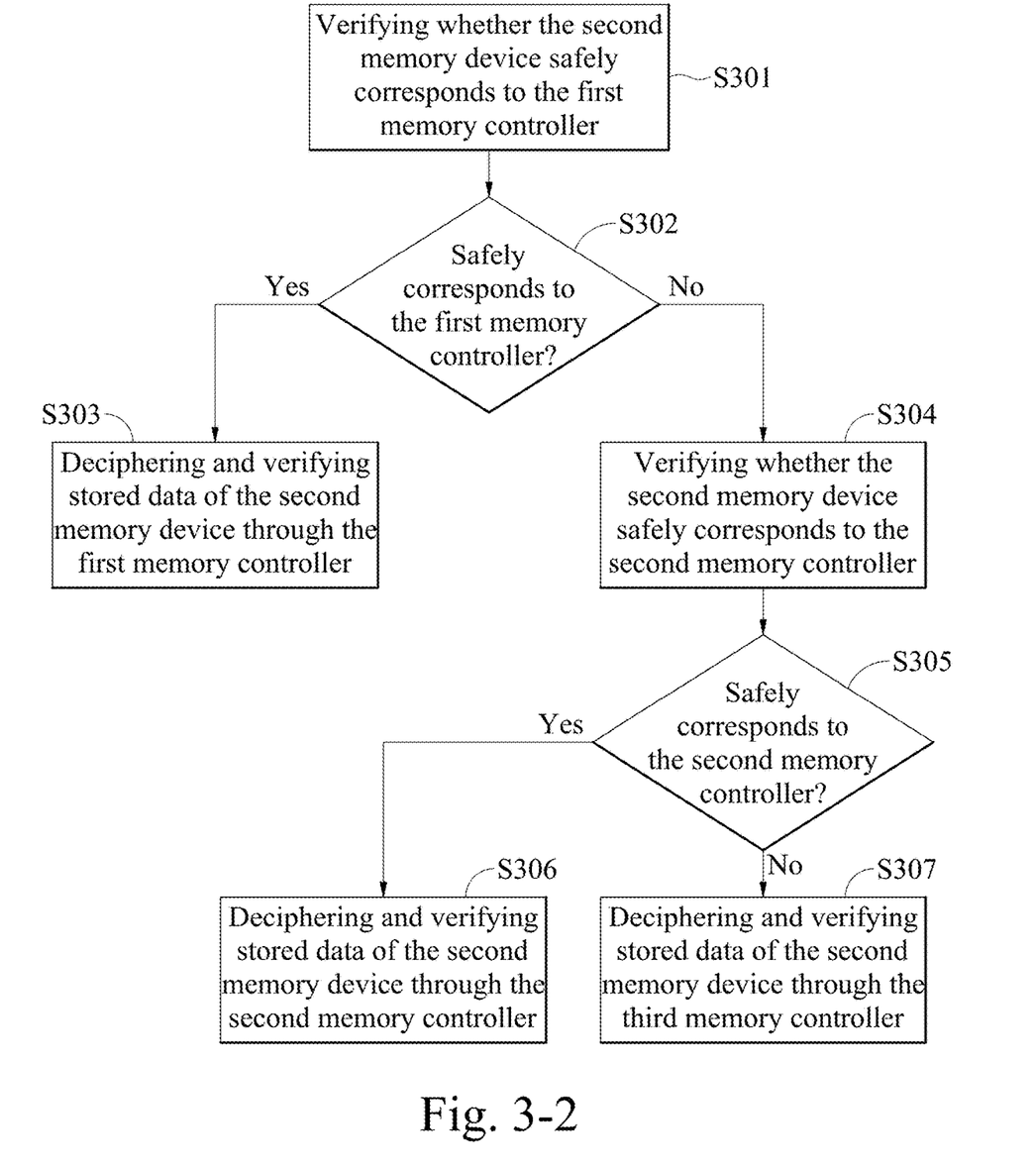

FIG. 3-2 illustrates a schematic flowchart of a boot method according to an exemplary embodiment of the instant disclosure. In this exemplary embodiment, the value of the aforementioned positive integer N is 3, that is, in this embodiment, the embedded electronic device 100 comprises memory controllers 103-1 through 103-3. Compared with the schematic flowchart of the boot method shown in FIG. 3-1, the schematic flowchart of the boot method shown in FIG. 3-2 further comprises the steps S305, S306, and S307. Please refer to FIG. 1 and FIG. 3-2. After the processor 101 executes the step S304, the processor 101 executes the step S305. In the step S305, the processor 101 determines whether the second memory device 105 safely corresponds to the second memory controller (i.e., the memory controller 103-2), and, if the determination comes out positive, the step S306 is executed, or else the step S307 is executed. In the step S306, because the processor 101 has determined that the second memory device 105 safely corresponds to the second memory controller, the processor 101 deciphers and verifies the stored data of the second memory device 105 through the second memory controller. In the step S307, because the processor 101 has determined that the second memory device 105 does not safely correspond to the second memory controller, the processor 101 directly deciphers and verifies the stored data of the second memory device 105 through the third memory controller.

In some exemplary embodiments of the instant disclosure, if the determination of the step S305 comes out negative, the processor 101 does not execute the step S307. Instead, the processor 101 further determines whether the second memory device 105 safely corresponds to the third memory controller, and, if the determination comes out positive, the processor 101 directly deciphers and verifies the stored data of the second memory device 105 through the third memory controller, or else the processor 101 sends out an error message.

Figure 4:
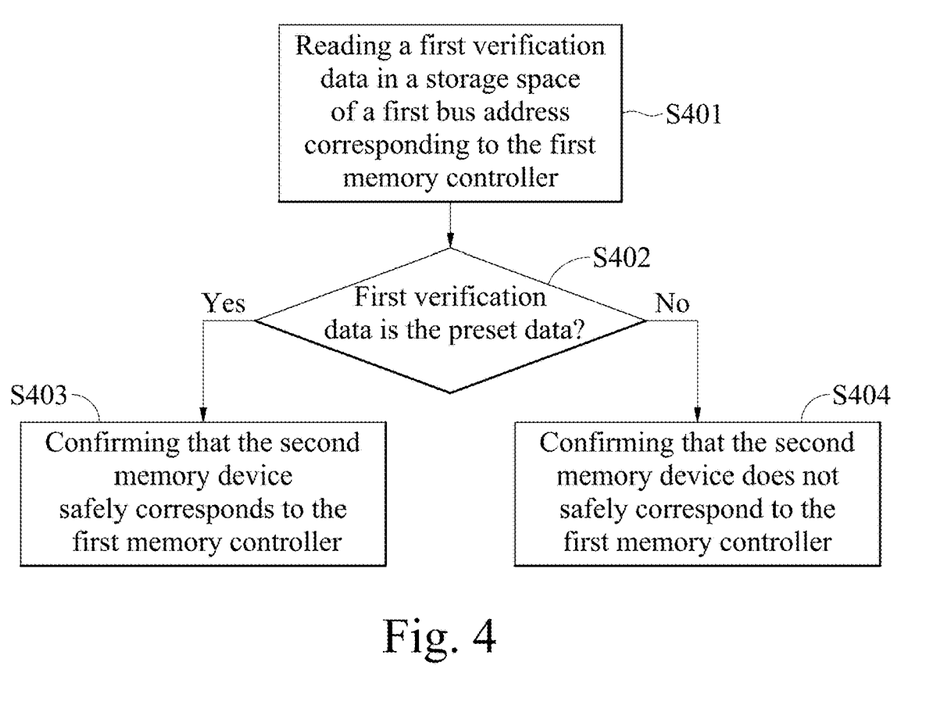
FIG. 4 illustrates a schematic flowchart of a boot method according to an exemplary embodiment of the instant disclosure.
Figure 5:
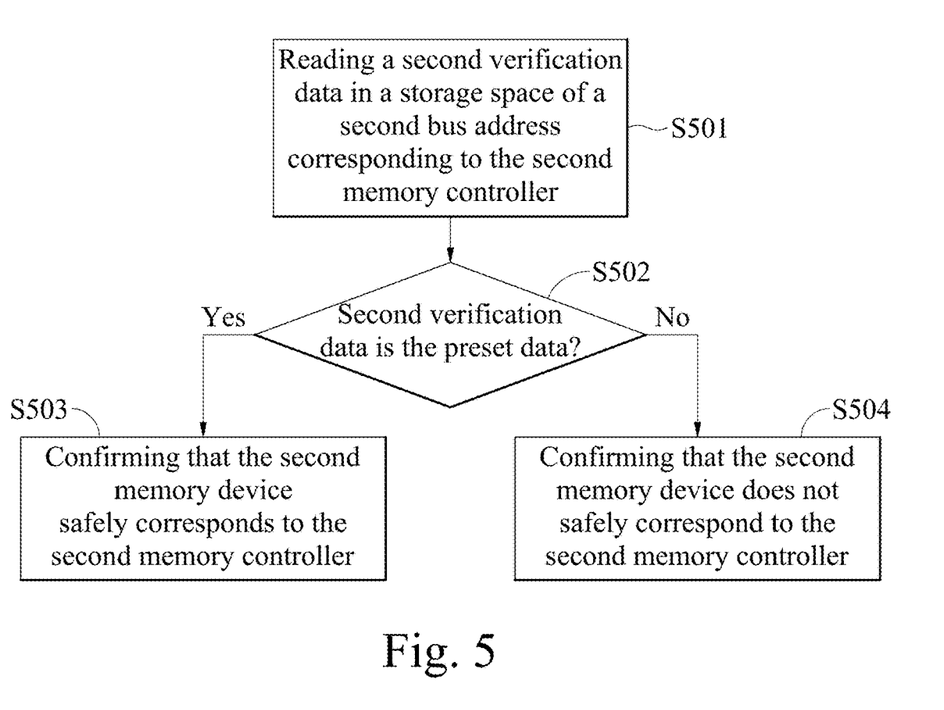
FIG. 5 illustrates a schematic flowchart of a boot method according to an exemplary embodiment of the instant disclosure.

FIG. 4 and FIG. 5 illustrate schematic flowcharts of a boot method according to an exemplary embodiment of the instant disclosure. In the exemplary embodiment shown in FIG. 4 and FIG. 5, the memory devices (including the second memory device 105) external to the embedded electronic device 100 are mapped to different bus addresses. As such, when the processor 101 attempts to conduct communication with the external memory devices, data are transmitted through address wires to these bus addresses. The external memory devices monitor the address wires, and the external memory device receives data transmitted through the corresponding address wires when the processor 101 transmits data toward corresponding bus addresses. The processor 101 can also read data related to the external memory devices through corresponding bus addresses. This design is called memory-mapped I/O (MMIO).

In this exemplary embodiment, the memory device corresponding to the first memory controller (i.e., the memory controller 103-1) is a 32M NAND flash memory, and the memory device corresponding to the second memory controller (i.e., the memory controller 103-2) is a 32M SPI NOR flash memory. The two external memories may be mapped according to the values shown in Table 1 below.

TABLE 1

| Item | NAND flash memory | SPI NOR flash memory |
|---|---|---|
| Memory device address | 0-0x1FFFFFF | 0-0x1FFFFFF |
| Bus address | 0xA0000000-0xA1FFFFFF | 0xB0000000-0xB1FFFFFF |

Please refer to FIG. 4. The step S301 further comprises the steps S401-S404 shown in FIG. 4. In the step S401, the processor 101 reads a first verification data in a storage space of a first bus address 0xA0000000-0x1FFFFFF corresponding to the first memory controller. In this exemplary embodiment, the first verification data is a 32-bit data and is located in the 32-bit memory after the initial address of 0xA0000000. It should be illustrated that the first verification data can be set as data of any size according to different requirements and can be stored in any location of the storage space of the first bus address 0xA0000000-0xA1FFFFFF. The instant disclosure is not limited thereto.

In the step S402, the processor 101 determines whether the first verification data is a preset data. In this exemplary embodiment, the preset data is 0xAA123456. If the processor 101 determines that the first verification data is the preset data, the step S403 is executed, or else the step S404 is executed. In the step S403, the processor 101 confirms that the second memory device 105 safely corresponds to the first memory controller by determining that the first verification data is the preset data. In the step S404, the processor 101 confirms that the second memory device 105 does not safely correspond to the first memory controller.

Please refer to FIG. 5. The step S304 further comprises the steps S501-S504 shown in FIG. 5. In the step S501, the processor 101 reads a second verification data in a storage space of a second bus address 0xB0000000-0xB1FFFFFF corresponding to the second memory controller. In this exemplary embodiment, the second verification data is a 32-bit data and is located in the 32-bit memory after the initial address of 0xA0000000. It should be illustrated that the second verification data can be set as data of any size according to different requirements and can be stored in any location of the storage space of the second bus address 0xB0000000-0xB1FFFFFF. The instant disclosure is not limited thereto.

In the step S502, the processor 101 determines whether the second verification data is the preset data. As previously illustrated, in this exemplary embodiment, the preset data is 0xAA123456. If the processor 101 determines that the second verification data is the preset data, the step S503 is executed, or else the step S504 is executed. In the step S503, the processor 101 confirms that the second memory device 105 safely corresponds to the second memory controller. In the step S504, the processor 101 confirms that the second memory device 105 does not safely correspond to the second memory controller.

Please refer to FIG. 3-2. As previously illustrated, in some exemplary embodiments of the instant disclosure, when the determination of the step S305 comes out negative, the processor 101 does not execute the step S307. Instead, the processor 101 further determines whether the second memory device 105 safely corresponds to the third memory controller, and, if this determination comes out positive, the processor 101 directly deciphers and verifies the stored data of the second memory device 105 through the third memory controller, or else the processor 101 sends out an error message. In some exemplary embodiments of the instant disclosure, the aforementioned step of further determining whether the second memory device 105 safely corresponds to the third memory controller by the processor 101 further comprises: reading a third verification data in a storage space of a third bus address corresponding to the third memory controller by the processor 101; determining whether the third verification data is the preset data by the processor 101; in response to that the third verification data is the preset data, confirming that the second memory device 105 safely corresponds to the third memory controller by the processor 101; in response to that the third verification data is not the preset data, confirming that the second memory device 105 does not safely correspond to the third memory controller by the processor 101.

In some exemplary embodiments of the instant disclosure, the first verification data comprises a first matching data, and the second verification data comprises a second matching data. Through the first matching data and the second matching data, the processor 101 can determine whether the first memory controller and the second memory controller can control the second memory device 105, respectively. In this exemplary embodiment, the processor 101 uses the last eight bits of the first verification data as the first matching data. When the first matching data is identical to the last eight bits of the preset data (i.e., the last eight bits of 0xAA123456 and thus 56 in this exemplary embodiment), the processor 101 can learn that the second memory device 105 is matched to the first memory controller, that is, in this embodiment, the first memory controller can control the second memory device 105. Then, the processor 101 confirms whether the first memory controller meets the safety requirement by comparing the first twenty-four bits of the first verification data with the first twenty-four bits of the preset data (i.e., the first twenty-four bits of 0xAA123456 and thus AA1234 in this exemplary embodiment). Similarly, the processor 101 uses the last eight bits of the second verification data as the second matching data. When the second matching data is identical to the last eight bits of the preset data (i.e., the last eight bits of 0xAA123456 and thus 56 in this exemplary embodiment), the processor 101 can learn that the second memory device 105 is matched to the second memory controller, that is, in this embodiment, the second memory controller can control the second memory device 105. Then, the processor 101 confirms whether the second memory controller meets the safety requirement by comparing the first twenty-four bits of the second verification data with the first twenty-four bits of the preset data (i.e., the first twenty-four bits of 0xAA123456 and thus AA1234 in this exemplary embodiment).

It should be illustrated that, in the aforementioned exemplary embodiment, the last eight bits of the first verification data is used as the first matching data, and the last eight bits of the second verification data is used as the second matching data. However, other bits of the first verification data and other bits of the second verification data may also be used as the first matching data and the second matching data, respectively, according to different requirements, and the instant disclosure is not limited thereto.

In some exemplary embodiments of the instant disclosure, the aforementioned stored data includes a second boot procedure which is enciphered. After the processor 101 executes the first boot procedure, the processor 101 continues to execute the second boot procedure so as to continue the initialization of the embedded electronic device 100.

Figure 2:
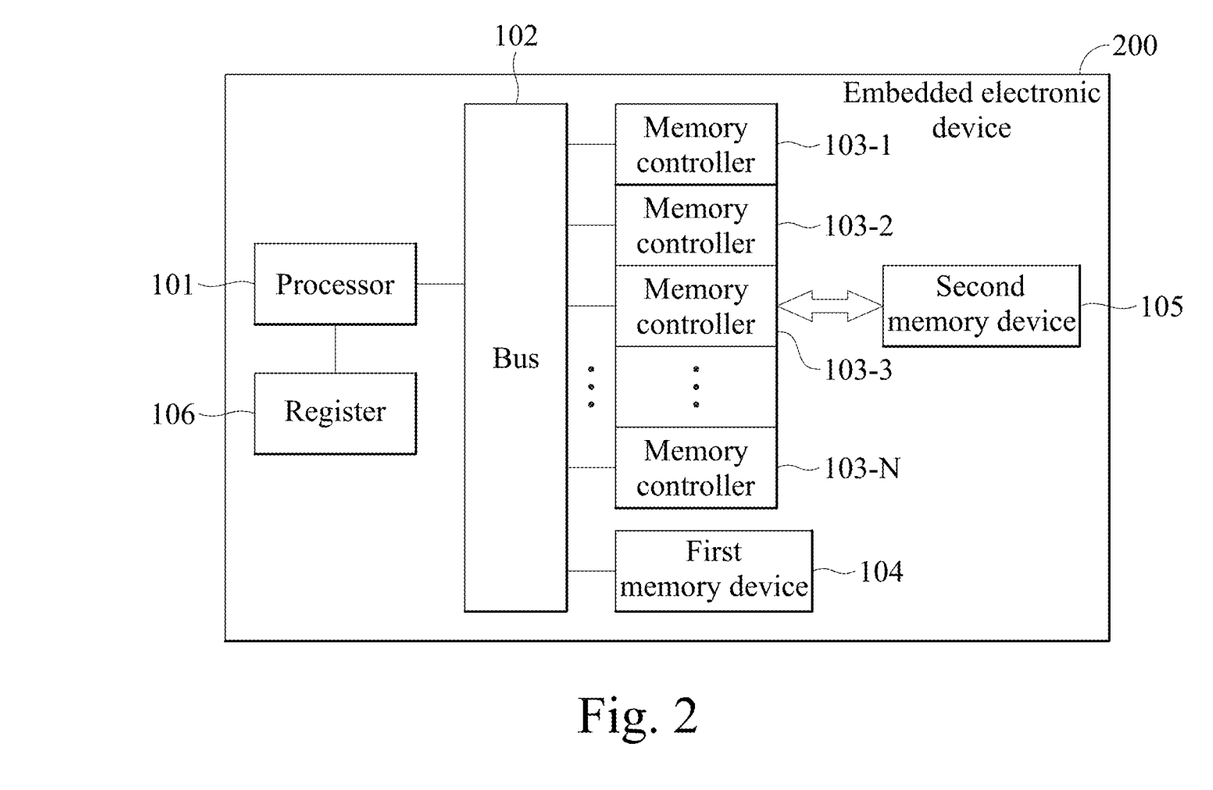
FIG. 2 illustrates a schematic block diagram of an embedded electronic device according to an exemplary embodiment of the instant disclosure.

FIG. 2 illustrates a schematic block diagram of an embedded electronic device 200 according to an exemplary embodiment of the instant disclosure. Please refer to FIG. 2. Compared with the embedded electronic device 100 shown in FIG. 1, the embedded electronic device 200 shown in FIG. 2 further comprises a register 106.

The following will illustrate in detail the boot method and the cooperation between the hardware components of the embedded electronic device 200 according to an exemplary embodiment of the instant disclosure with the aid of provided figures.

Figure 61:
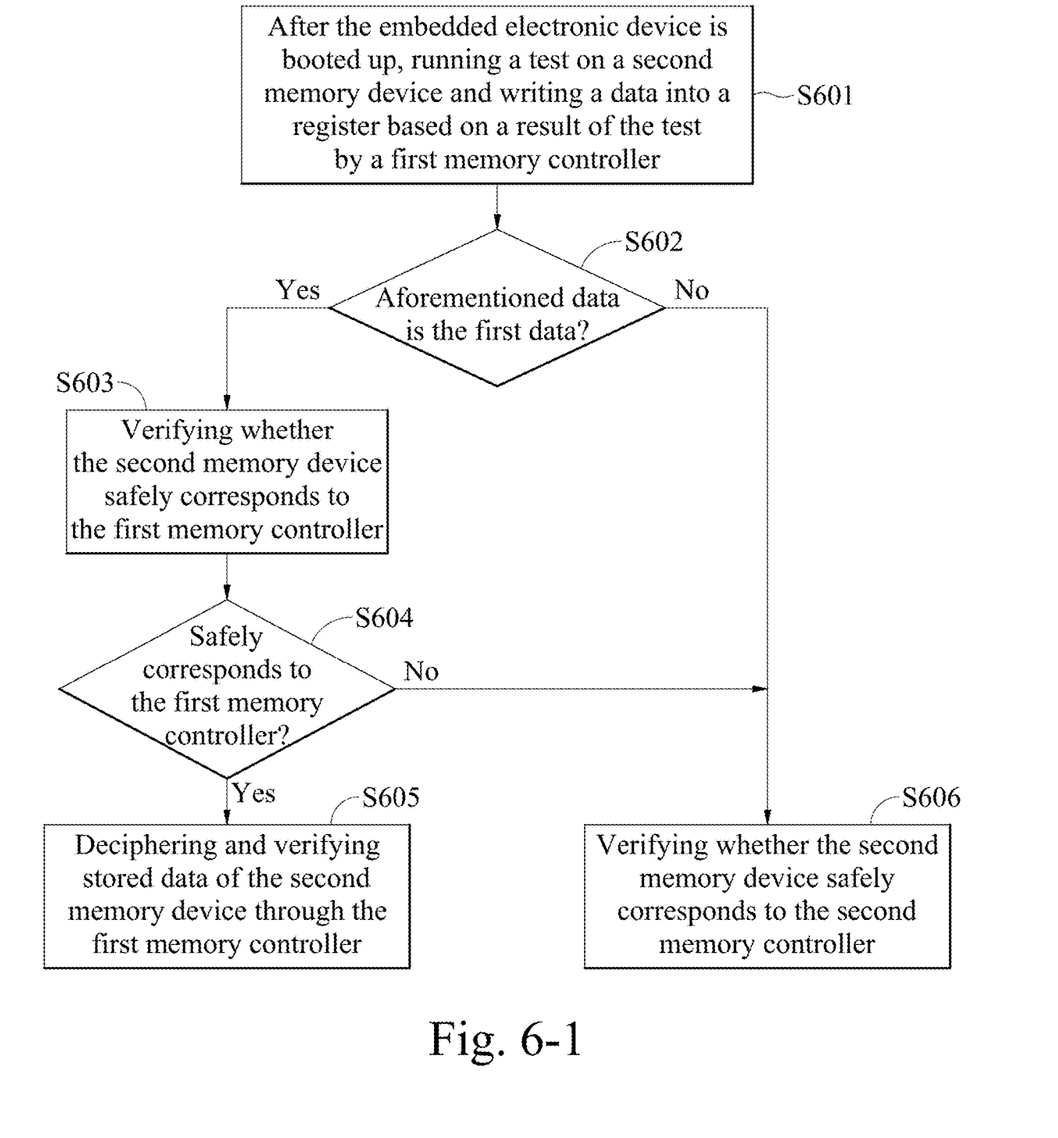

FIG. 6-1 illustrates a schematic flowchart of a boot method according to an exemplary embodiment of the instant disclosure. For illustrative purposes, the memory controller 103-1 is referred to as a first memory controller, the memory controller 103-2 is referred to as a second memory controller, the memory controller 103-3 is referred to as a third memory controller, and so on hereinafter. Please refer to FIG. 2 and FIG. 6-1. In this exemplary embodiment, in the step S601, in order to verify the second memory device 105 quickly, after the embedded electronic device 200 is powered on, the first memory controller (i.e., the memory controller 103-1) runs a test on the second memory device 105 and then writes a data into the register 106 according to the result of the test.

After the step S601, the processor 101 executes the steps S602-S606 according to the first boot procedure. In the step S602, the processor 101 reads the aforementioned data written into the register 106 and compares the aforementioned data with a first value. If the aforementioned data is identical to the first value, the first memory controller can control the second memory device 105, and then the step S603 is executed. If the aforementioned data is not identical to the first value, the first memory controller cannot control the second memory device 105, and then the step S606 is executed.

In the step S603, the processor 101 verifies whether the second memory device 105 safely corresponds to the first memory controller (i.e., the memory controller 103-1). Because the processor 101 has verified that the first memory controller can control the second memory device 105 in the step S602, the processor 101 just further verifies whether the second memory device 105 meets the requirement for safe booting in the step S603. In the step S604, the processor 101 determines whether the second memory device 105 safely corresponds to the first memory controller, and, if the determination comes out positive, the step S605 is executed, or else the step S606 is executed. In the step S605, the processor 101 deciphers and verifies stored data of the second memory device 105 through the first memory controller. In the step S606, because the processor 101 has determined that the second memory device 105 does not safely correspond to the first memory controller, the processor 101 verifies whether the second memory device 105 safely corresponds to the second memory controller.

Figure 62:
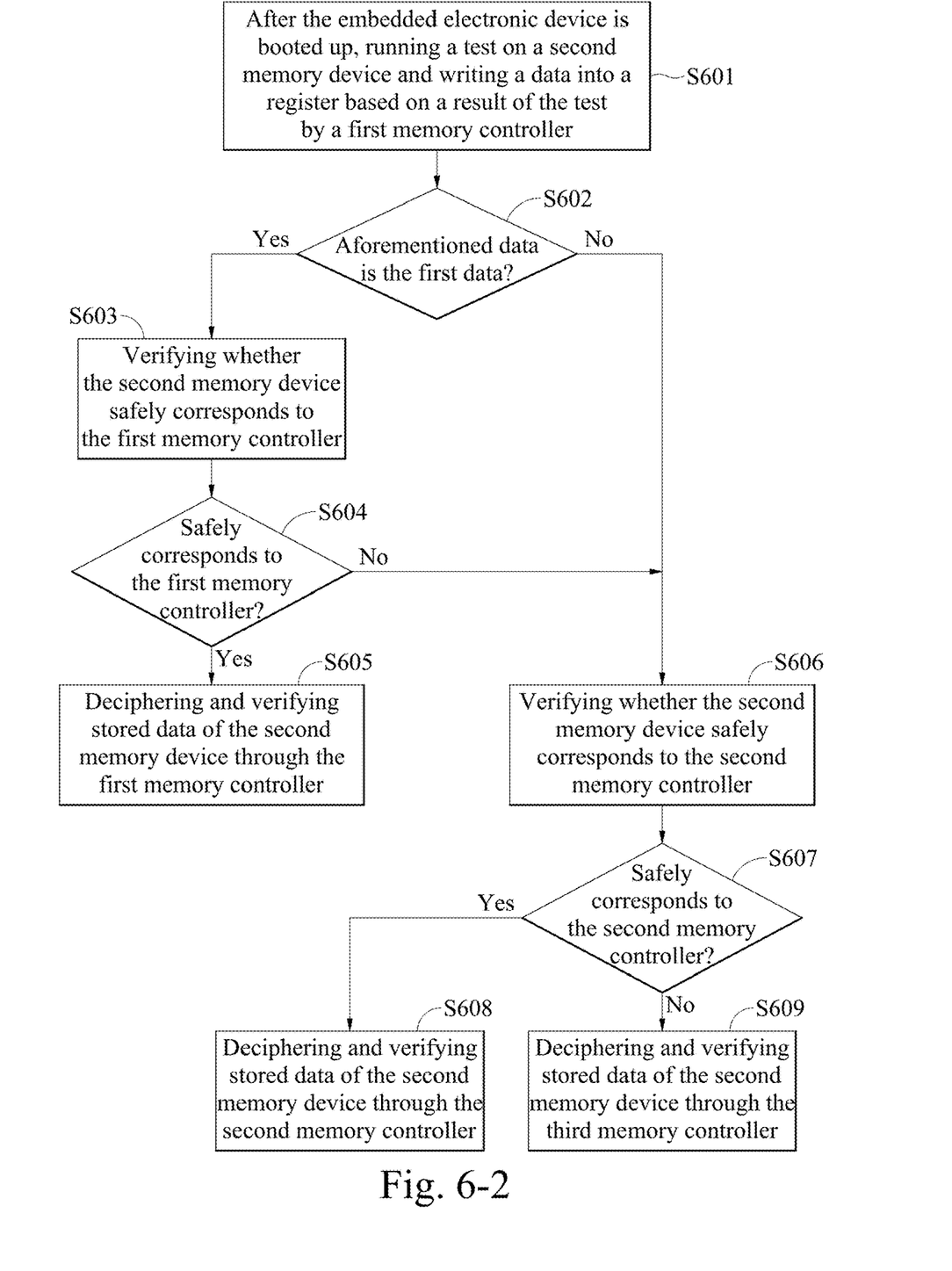

FIG. 6-2 illustrates a schematic flowchart of a boot method according to an exemplary embodiment of the instant disclosure. In this exemplary embodiment, the value of the aforementioned positive integer N is 3, that is, in this embodiment, the embedded electronic device 200 comprises memory controllers 103-1 through 103-3. Compared with the schematic flowchart of the boot method shown in FIG. 6-1, the schematic flowchart of the boot method shown in FIG. 6-2 further comprises the steps S607, S608, and S609. Because the steps S607, S608, and S609 shown in FIG. 6-2 are respectively identical to the steps S305, S306, and S307 shown in FIG. 3-2, the illustration for the steps S607, S608, and S609 will not be repeatedly illustrated here. It should be further illustrated that, in some exemplary embodiments of the instant disclosure, when the determination of the step S607 comes out negative, the processor 101 does not execute the step S609. Instead, the processor 101 further determines whether the second memory device 105 safely corresponds to the third memory controller, and, if the determination comes out positive, the processor 101 directly deciphers and verifies the stored data of the second memory device 105 through the third memory controller, or else the processor 101 sends out an error message.

Figure 7:
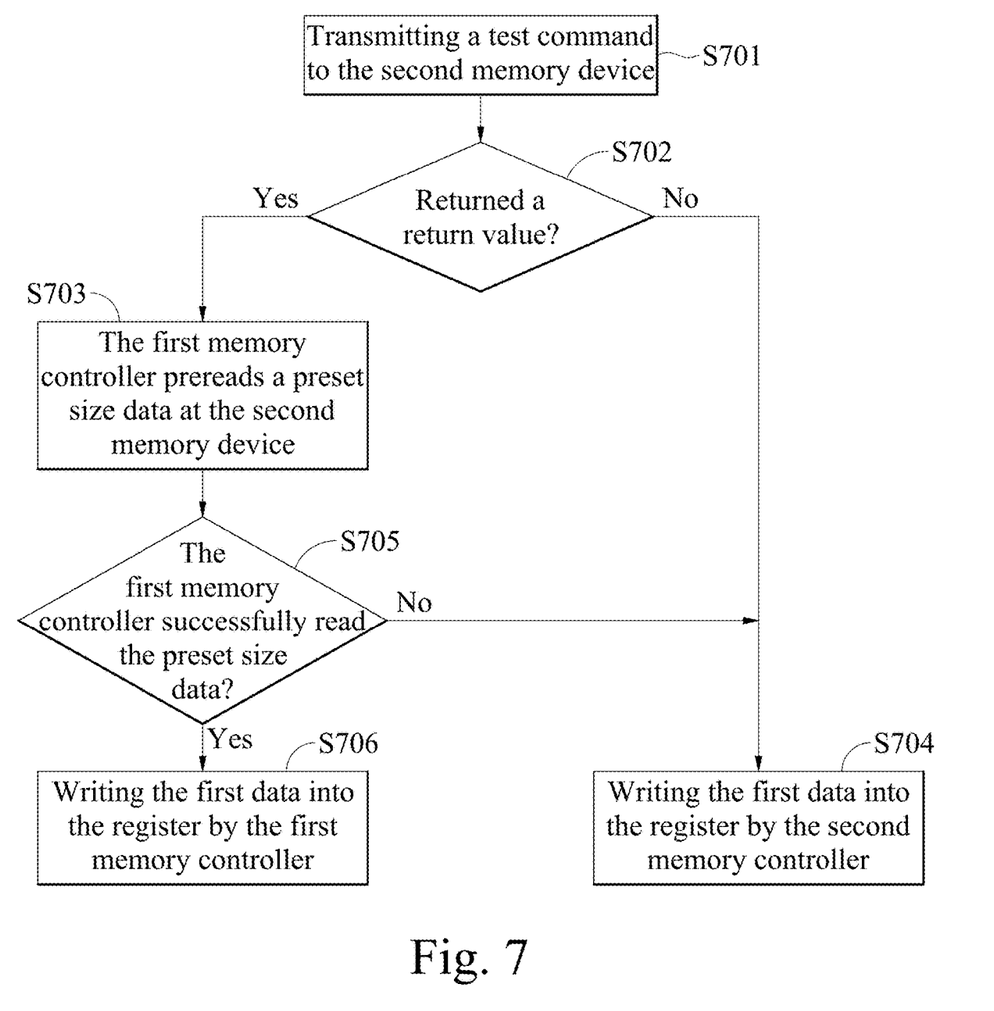
FIG. 7 illustrates a schematic flowchart of a boot method according to an exemplary embodiment of the instant disclosure.

FIG. 7 illustrates a schematic flowchart of a boot method according to an exemplary embodiment of the instant disclosure. Please refer to FIG. 7. In the exemplary embodiment shown in FIG. 7, the step S601 comprises steps the S701-S706. In the step S701, the first memory controller (i.e., the memory controller 103-1) transmits a test command to the second memory device 105. If the first memory controller can control the second memory device 105, the second memory device 105 will generate a reaction at the aforementioned test command and return a return value (such as, but not limited to, a value currently stored in a state register of the second memory device 105). In the step S702, if the second memory device 105 has returned a return value, the step S703 is then executed, or else the step S704 is then executed. In the step S703, the first memory controller prereads a default size data (a data with a default size) at the second memory device 105. The default size may be, but not limited to, the size of a read unit of the first memory controller or the size of the aforementioned first verification data. In the step S705, the first memory controller determines whether the prereading was successful, and, if the determination comes out positive, the step S706 is executed, or else the step S704 is executed.

In the step S706, the first memory controller writes the aforementioned first value into the register 106. In the step S704, the first memory controller writes the aforementioned second value into the register 106. The first value and the second value just have to be able to record whether the second memory device 105 generated a reaction to the test command and whether the first memory controller successfully preread the default size data, respectively, and the form of the first value and the second value is not limited in this invention.

Figure 8:
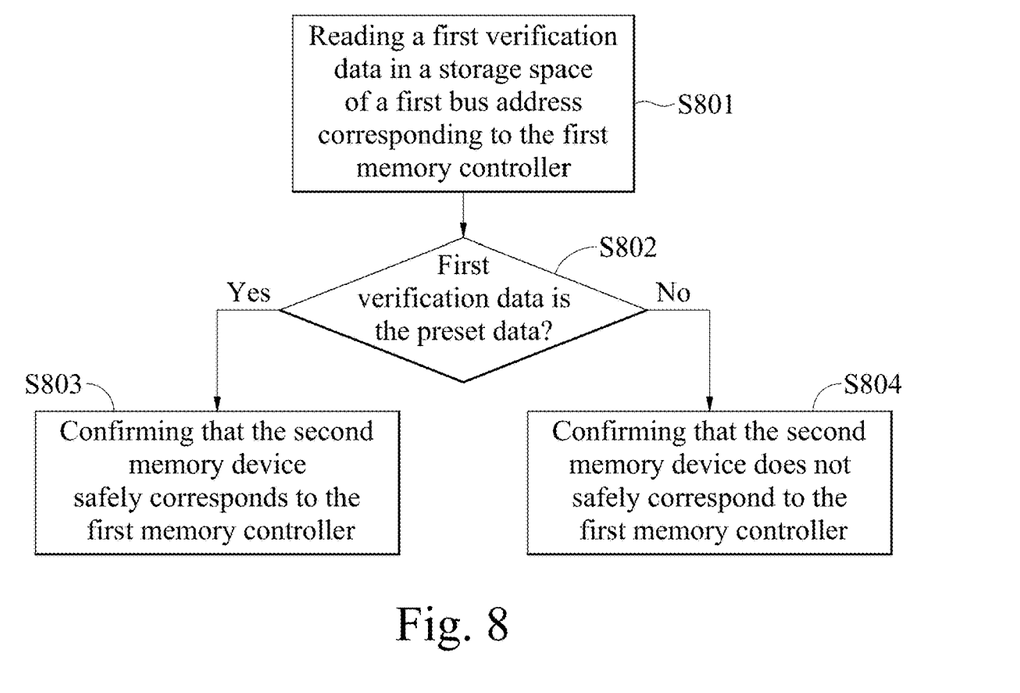
FIG. 8 illustrates a schematic flowchart of a boot method according to an exemplary embodiment of the instant disclosure.
Figure 9:
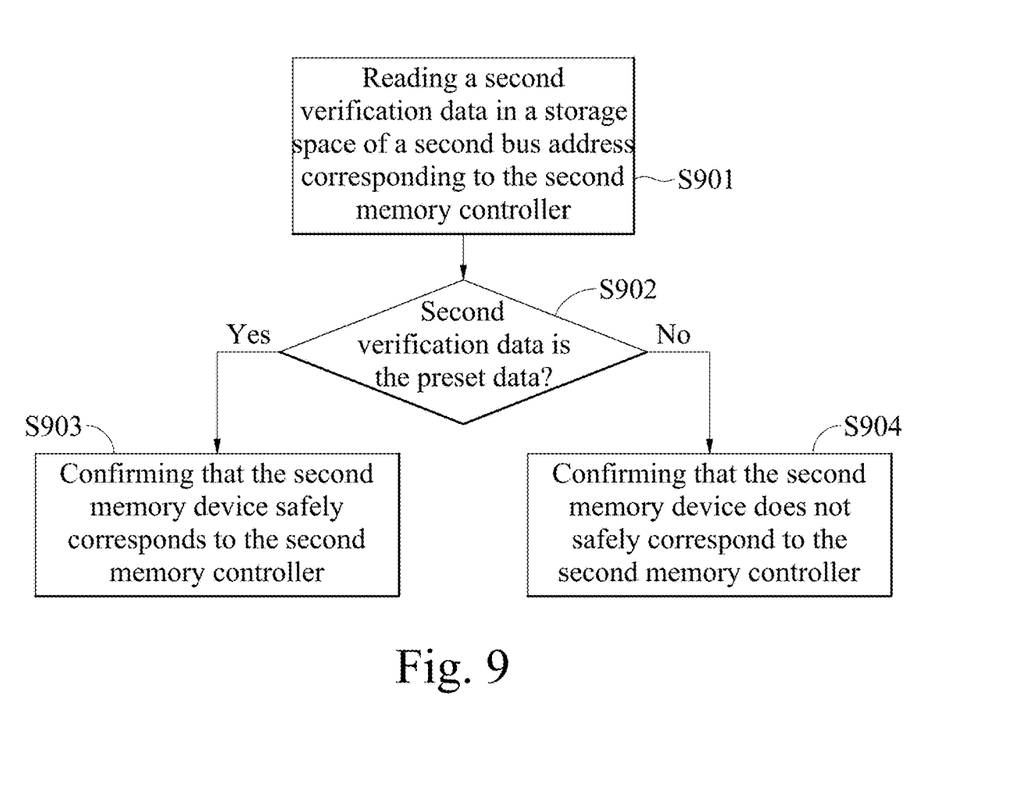
FIG. 9 illustrates a schematic flowchart of a boot method according to an exemplary embodiment of the instant disclosure.

FIG. 8 and FIG. 9 illustrate schematic flowcharts of a boot method according to an exemplary embodiment of the instant disclosure. In the exemplary embodiment shown in FIG. 8 and FIG. 9, the memory devices (including the second memory device 105) external to the embedded electronic device 100 are designed according to the aforementioned MMIO method (i.e., in this embodiment, the memory devices (including the second memory device 105) external to the embedded electronic device 100 are mapped to different bus addresses). Because the steps S801-S804 shown in FIG. 8 are identical to the steps S401-S404 shown in FIG. 4, respectively, and the steps S901-S904 shown in FIG. 9 are identical to the steps S501-S504 shown in FIG. 5, respectively, the illustration for FIG. 8 and FIG. 9 can be referred to the illustration for FIG. 4 and FIG. 5 and will not be repeatedly illustrated here. It should be illustrated that, because the second memory device 105 has generated an reaction to the test command transmitted by the first memory controller and the first memory controller has successfully preread the default size data in the step S706, in the step S802 shown in FIG. 8, the processor 101 does not have to repeatedly test whether the first memory controller can control the second memory device 105, and thus the first verification data may not have to include the first matching data.

In some exemplary embodiments of the instant disclosure, the aforementioned stored data includes the enciphered second boot procedure of the embedded electronic device 200. After the processor 101 executes the first boot procedure, the processor 101 continues to execute the second boot procedure so as to continue the initialization of the embedded electronic device 200.

As above, some exemplary embodiments of the instant disclosure provide an embedded electronic device and a boot method, wherein through memory-mapped I/O (MMIO) architecture, the data of the bus address being mapped by the external memory device can be read. As a result, the correctness and safety of the external memory device can be verified without occupying more GPIO pins, and thus a safe second boot procedure can be read.

Although the technical context of the instant disclosure has been disclosed using the exemplary embodiments above, the exemplary embodiments are not meant to limit the instant disclosure. Any alteration and retouch made by persons skilled in the art without deviating from the spirit of the instant disclosure shall fall into the scope of the instant disclosure. The scope of protected invention shall be defined by the claims below.

What is claimed is:

1. An embedded electronic device comprising:
   a processor;
   a first memory device configured to store a first boot procedure;
   a plurality of memory controllers comprising a first memory controller and a second memory controller; and
   a second memory device connected to the memory controllers;
   wherein the processor is configured to execute following steps based on the first boot procedure:
   (a) verifying whether the second memory device safely corresponds to the first memory controller;
   (b) in response to that the second memory device safely corresponds to the first memory controller, deciphering and verifying stored data of the second memory device through the first memory controller; and
   (c) in response to that the second memory device does not safely correspond to the first memory controller, verifying whether the second memory device safely corresponds to the second memory controller.

2. The embedded electronic device according to claim 1, wherein the step (a) comprises: reading a first verification data in a storage space of a first bus address corresponding to the first memory controller; in response to that the first verification data is a preset data, confirming that the second memory device safely corresponds to the first memory controller; and in response to that the first verification data is not the preset data, confirming that the second memory device does not safely correspond to the first memory controller.

3. The embedded electronic device according to claim 2, wherein the step (c) comprises: reading a second verification data in a storage space of a second bus address corresponding to the second memory controller and comparing the second verification data with the preset data; in response to that the second verification data is the preset data, confirming that the second memory device safely corresponds to the second memory controller; and in response to that the second verification data is not the preset data, confirming that the second memory device does not safely correspond to the second memory controller.

4. The embedded electronic device according to claim 3, wherein the first verification data comprises a first matching data, the second verification data comprises a second matching data, the first matching data is used to match the first memory controller with the second memory device, and the second matching data is used to match the second memory controller with the second memory device.

5. The embedded electronic device according to claim 1, wherein the stored data comprises a second boot procedure, and the processor is configured to execute the second boot procedure after the processor executes the first boot procedure.

6. The embedded electronic device according to claim 1, wherein the first memory device is a read-only memory (ROM) device, and the second memory device is a flash memory device.

7. An embedded electronic device comprising:
   a processor;
   a first memory device configured to store a first boot procedure;

a plurality of memory controllers comprising a first memory controller and a second memory controller; and a second memory device connected to the memory controllers;

wherein the first memory controller is configured to run a test on the second memory device and write a data into a register based on a result of the test after the embedded electronic device is booted up;

the processor is configured to execute following steps based on the first boot procedure:

(a) in response to that the data is a first value, verifying whether the second memory device safely corresponds to the first memory controller; and in response to that the second memory device safely corresponds to the first memory controller, deciphering and verifying stored data of the second memory device through the first memory controller; and (b) in response to that the data is a second value or that the second memory device does not safely correspond to the first memory controller, verifying whether the second memory device safely corresponds to the second memory controller.

8. The embedded electronic device according to claim 7, wherein the step of running the test on the second memory device and writing the data into the register based on the result of the test by the first memory controller comprises: transmitting a test command to the second memory device; in response to that the second memory device returns a return value, prereading a default size data from the second memory device by the first memory controller; in response to that the first memory controller successfully reads the default size data, writing the first data into the register by the first memory controller; and in response to that the second memory device does not return the return value, writing the second data into the register by the first memory controller.

9. The embedded electronic device according to claim 8, wherein the step (a) comprises: reading a first verification data in a storage space of a first bus address corresponding to the first memory controller; in response to that the first verification data is a preset data, confirming that the second memory device safely corresponds to the first memory controller; and in response to that the first verification data is not the preset data, confirming that the second memory device does not safely correspond to the first memory controller.

10. The embedded electronic device according to claim 9, wherein the step (b) comprises: reading a second verification data in a storage space of a second bus address corresponding to the second memory controller and comparing the second verification data with the preset data; in response to that the second verification data is the preset data, confirming that the second memory device safely corresponds to the second memory controller; and in response to that the second verification data is not the preset data, confirming that the second memory device does not safely correspond to the second memory controller.

11. The embedded electronic device according to claim 10, wherein the second verification data comprises a matching data, and the matching data is used to match the second memory controller with the second memory device.

12. The embedded electronic device according to claim 7, wherein the stored data comprises a second boot procedure, and the processor is configured to execute the second boot procedure after the processor executes the first boot procedure.

13. The embedded electronic device according to claim 7, wherein the first memory device is a read-only memory (ROM) device, and the second memory device is a flash memory device.

14. A boot method adapted for an embedded electronic device, wherein the embedded electronic device comprises: a processor; a first memory device configured to store a first boot procedure; a plurality of memory controllers comprising a first memory controller and a second memory controller; and a second memory device connected to the memory controllers;

wherein the boot method comprises:

executing following steps by the processor based on the first boot procedure:

(a) verifying whether the second memory device safely corresponds to the first memory controller;

(b) in response to that the second memory device safely corresponds to the first memory controller, deciphering and verifying stored data of the second memory device through the first memory controller; and (c) in response to that the second memory device does not safely correspond to the first memory controller, verifying whether the second memory device safely corresponds to the second memory controller.

15. The boot method according to claim 14, wherein the step (a) comprises: reading a first verification data in a storage space of a first bus address corresponding to the first memory controller; in response to that the first verification data is a preset data, confirming that the second memory device safely corresponds to the first memory controller; and in response to that the first verification data is not the preset data, confirming that the second memory device does not safely correspond to the first memory controller.

16. The boot method according to claim 15, wherein the step (c) comprises: reading a second verification data in a storage space of a second bus address corresponding to the second memory controller and comparing the second verification data with the preset data; in response to that the second verification data is the preset data, confirming that the second memory device safely corresponds to the second memory controller; and in response to that the second verification data is not the preset data, confirming that the second memory device does not safely correspond to the second memory controller.

17. The boot method according to claim 16, wherein the first verification data comprises a first matching data, the second verification data comprises a second matching data, the first matching data is used to match the first memory controller with the second memory device, and the second matching data is used to match the second memory controller with the second memory device.

18. The boot method according to claim 14, wherein the stored data comprises a second boot procedure, and the processor executes the second boot procedure after the processor executes the first boot procedure.

* * * * *